J. A. BOSTWICK.
BALING PRESS.
No. 181,554. Patented Aug. 29, 1876.
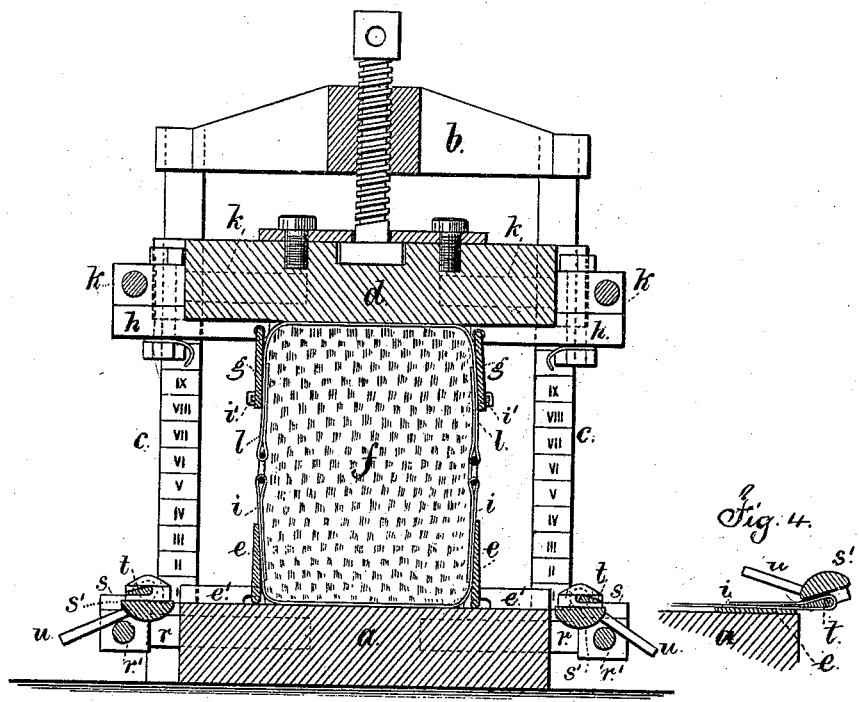
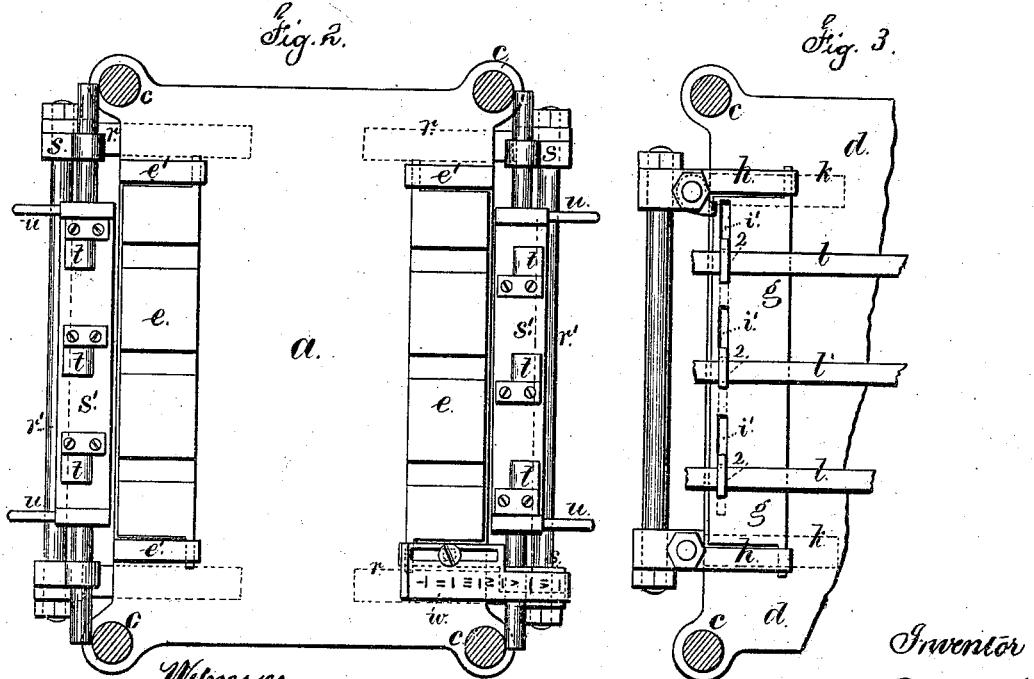

UNITED STATES PATENT OFFICE.

JABEZ A. BOSTWICK, OF NEW YORK, N. Y.

IMPROVEMENT IN BALING-PRESSES.

Specification forming part of Letters Patent No. 181,554, dated August 29, 1876; application filed February 25, 1876.

*To all whom it may concern:*

Be it known that I, JABEZ A. BOSTWICK, of the city and State of New York, have invented an Improvement in Baling-Presses, of which the following is a specification:

It is usual in baling-presses to make the top and bottom platens with grooves receiving the ropes or hoops. There is a loss by this operation, because the bale expands into these grooves, and hence the bands or hoops cannot be drawn to the same size as the bale is compressed, and the bale expands when the pressure is removed more than is necessary.

I employ smooth platens and divided hoops, so that the hoops are laid upon the lower platen and upon the bale. The pressure is applied to the bale, the hoops are folded at both sides of the bale to a gage, and then bale-ties are used to unite the hoops at each side of the bale. By this arrangement the bale is held nearly of the size to which it is compressed, and the usual loss by expansion is avoided.

In the drawing, Figure 1 is a vertical cross-section, showing the folding devices. Fig. 2 is a horizontal section; and Fig. 3 is an inverted plan of a portion of the upper platen.

The lower platen $a$, and head-block $b$, are united by the tie-rods $c$, and the platen $d$ is actuated by a screw or other power of any suitable character, and $f$ represents the bale being pressed. Upon the platen $a$, at each side, is the gage-plate $e$, that is grooved to receive the hoops $i$, and determine their position. The bale $f$ is rolled in upon these hoops after they are in place; the gage-plates $e$ are free from the bale, and held by studs at their ends in line with the inner edges, which studs enter grooves in the blocks $e'$. The folding-plates $g$ are hinged at their inner corners to the bars $h$, and these bars $h$ are upon the rods $k$ that slide in holes in the platen $d$, or they may be supported in any other convenient manner, so as to be moved in or out, according to the width of the bale. Upon these plates $g$ there are bars $i'$, with hooks 2 passing through mortises in the plates $g$. These hooks are positioned to correspond with the grooves in the plates $e$, and the hooks serve to support the upper hoops $l$, the same being laid above the hooks so as to be supported by them until the platen is pressed against the bale and holds the hoops in position, after which the bars $i'$ are moved endwise to draw the hooks from beneath the hoops, so that the hoops are free to be bent down against the sides of the bale by turning the plates $g$ down. They swing upon their centers in the bars $h$ in being moved up or down, and it is to be understood that the bars $h$ are pressed toward the bale so that the folding-plates $g$ will bend the hoops closely against the sides of the bale. The length of the upper hoops $l$ is to be predetermined by their ends being folded over in a separate machine, so that when the said hoops $l$ are folded down against the sides of the bale, they will all be at a uniform height. It will now be apparent that the length of the lower hoops $i$ must be determined, so that when the bale is pressed and the hoops folded up against the sides of the bale, their ends will reach the ends of the hoops $l$, and be in a position to receive the bale-ties.

To effect this object I employ the following means: The sliding bars $r\ r$ are connected by the cross-bar $r'$, and upon the bars $r$ there are journal-boxes $s$ for the folding-bar $s'$, and upon this folding-bar $s'$ are the folders $t$, each of which folders is made as a hook-shaped block projecting laterally from the stock that is screwed to the bar $s'$, so that the hoops can be laid beneath these folders $t$, and then by means of a rule or gage the distance between the platen $a$ and the ends of the hoops $l$ can be measured, and the sliding bars $r$ drawn out or pushed in until the edges of the folders $t$ are away from the bale the proper distance; then the folding-bar $s'$ is partially revolved by the lever $u$, and the ends of the hoops $i$ are folded over, as shown in Fig. 1. The folding-bar $s'$ is then moved endwise in its journal-boxes $s$ to unhook the folders from the hoops, and the plate $e$ is then turned up against the side of the bale, carrying with it the hoops $i$, which are brought up to the required proximity to the ends of the hoops $l$ for the bale-tie to be used in uniting the ends of such hoops.

It will be apparent that any suitable bale-tie may be employed to unite the loops at the ends of the hoops, and that the ends of the hoops are to be brought more or less closely together, according to the tie employed.

I find it convenient to mark upon the columns or tie-rod c the feet and inches or other visions, as shown, and these measurements e to be numbered from the bottom up, so as  easily see the height that there is from e platen a to the loops at the ends of the pper hoops l, and a sliding gage, w, similarly arked and numbered from the end next the le, serves to determine the corresponding stance to which the slide r is to be moved r placing the folders t at the place where e hoop i is to be bent.

This improvement may be applied to platens ready grooved, in which case the hoops will  where the surface of the platen is plain instead of being laid in the grooves as heretofore.

I claim as my invention—

1. The plates g hung by hinges and swinging near the upper edges of the bale, in combination with the slide-bar i', and hooks 2, bstantially as and for the purposes set forth.

2. The folding-bar s', with the folders t, rning and sliding in bearings s, in combination with the slide-bars r, for varying the distance of the folders from the bale, substantially as set forth.

3. The combination, with the folding-bar s', and folders t, of the hinged plate e, that is movable toward or from the bale, and serves to turn up the hoops against the sides of the bale, substantially as set forth.

4. The combination, with the folding-bar s', of the gages to determine the position of the folding-bar to produce the length required in the hoops, substantially as set forth.

5. An adjustable folding mechanism applied to a baling-press for folding the ends of the hoops, in substantially the manner set forth.

Signed by me this 19th day of February, A. D. 1876.

J. A. BOSTWICK.

Witnesses:
 GEO. T. PINCKNEY,
 CHAS. H. SMITH.